(12) United States Patent
Tateishi et al.

(10) Patent No.: US 9,876,426 B2
(45) Date of Patent: Jan. 23, 2018

(54) ON-PERIOD SETTING CIRCUIT, POWER CONTROL IC, AND SWITCHING POWER SUPPLY DEVICE

(71) Applicant: Rohm Co., Ltd., Kyoto (JP)

(72) Inventors: Tetsuo Tateishi, Kyoto (JP); Genki Tsuruyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/086,215

(22) Filed: Mar. 31, 2016

(65) Prior Publication Data

US 2016/0301309 A1 Oct. 13, 2016

(30) Foreign Application Priority Data

Apr. 10, 2015 (JP) .................. 2015-080915

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 3/1588* (2013.01); *H02M 2001/0009* (2013.01); *H02M 2001/0032* (2013.01); *Y02B 70/1466* (2013.01); *Y02B 70/16* (2013.01)

(58) Field of Classification Search
CPC .......... H02M 1/08; H02M 1/44; H02M 3/158; H02M 3/1588; H02M 2001/0009; H02M 2001/0032

See application file for complete search history.

(56) References Cited

U.S. PATENT DOCUMENTS

| 6,212,079 B1 * | 4/2001 | Balakrishnan .... H02M 3/33507 323/284 |
| 8,476,887 B2 | 7/2013 | Tateishi et al. |
| 2006/0119340 A1 | 6/2006 | Tateishi |
| 2009/0201346 A1 | 8/2009 | Miyata et al. |
| 2012/0081476 A1 | 4/2012 | Miyata et al. |
| 2013/0249516 A1 | 9/2013 | Tateishi et al. |
| 2015/0145489 A1 * | 5/2015 | Hou .................... H02M 3/1588 323/271 |
| 2015/0155783 A1 * | 6/2015 | Li ......................... H03F 1/0227 323/271 |

* cited by examiner

*Primary Examiner* — Matthew Nguyen
(74) *Attorney, Agent, or Firm* — Fish & Richardson P.C.

(57) ABSTRACT

An ON-period setting circuit is provided in a fixed-ON-period switching power supply device that produces a desired output voltage from an input voltage by driving a coil by turning ON and OFF an output transistor and a synchronous rectification transistor. The ON-period setting circuit shortens the ON period the more the lighter the load is in a discontinuous-current mode. Or, the ON-period setting circuit transiently shortens the ON period on completion of a transition from a discontinuous-current mode to a continuous-current mode.

13 Claims, 16 Drawing Sheets

ON-PERIOD SETTING CIRCUIT, POWER CONTROL IC, AND SWITCHING POWER SUPPLY DEVICE

CROSS-REFERENCE TO RELATED APPLICATIONS

This application is based on Japanese Patent Application No. 2015-080915 filed on Apr. 10, 2015, the contents of which are hereby incorporated by reference.

BACKGROUND OF THE INVENTION

1. Field of the Invention

The present invention relates to an ON-period setting circuit, and to a power control IC and a switching power supply device incorporating it.

2. Description of Related Art

Compared with non-linear-control switching power supply devices (e.g., fixed-ON-period, fixed-OFF-period, and hysteresis-window switching power supply devices), linear-control switching power supply devices (e.g., voltage-mode-control and current-mode-control switching power supply devices) have the advantage of providing good load response with a simple circuit configuration.

Some switching power supply devices are furnished with a function of detecting reversal of a coil current under a light load to forcibly turn off a synchronous rectification transistor (a so-called reverse current cut-off function).

One example of the conventional technology discussed above is seen in U.S. Pat. No. 8,476,887.

Inconveniently, with conventional switching power supply devices, when a laminated ceramic capacitor with a low equivalent series resistance is used as an output smoothing capacitor, large output ripples result in a discontinuous-current mode (i.e., a light-load condition, where reversal of a coil current can occur).

Moreover, with conventional switching power supply devices, no hysteresis is given to the threshold value of the load current at which transition between a continuous-current mode (a heavy-load condition, where no reversal of a coil current occurs) and a discontinuous-current mode takes place. This makes transition between the two modes unstable, and causes repeated transition back and forth between the two modes, resulting in increased output ripples.

SUMMARY OF THE INVENTION

In view of the above-mentioned problems found by the present inventors, an object of the present invention is to provide an ON-period setting circuit that can reduce output ripples, and to provide a power control IC and a switching power supply device incorporating such an ON-period setting circuit.

According to what is disclosed herein, an ON-period setting circuit is provided in a fixed-ON-period switching power supply device that produces a desired output voltage from an input voltage by driving a coil by turning ON and OFF an output transistor and a synchronous rectification transistor, and is configured to shorten the ON period the more the lighter the load is in a discontinuous-current mode.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

Figure 1:
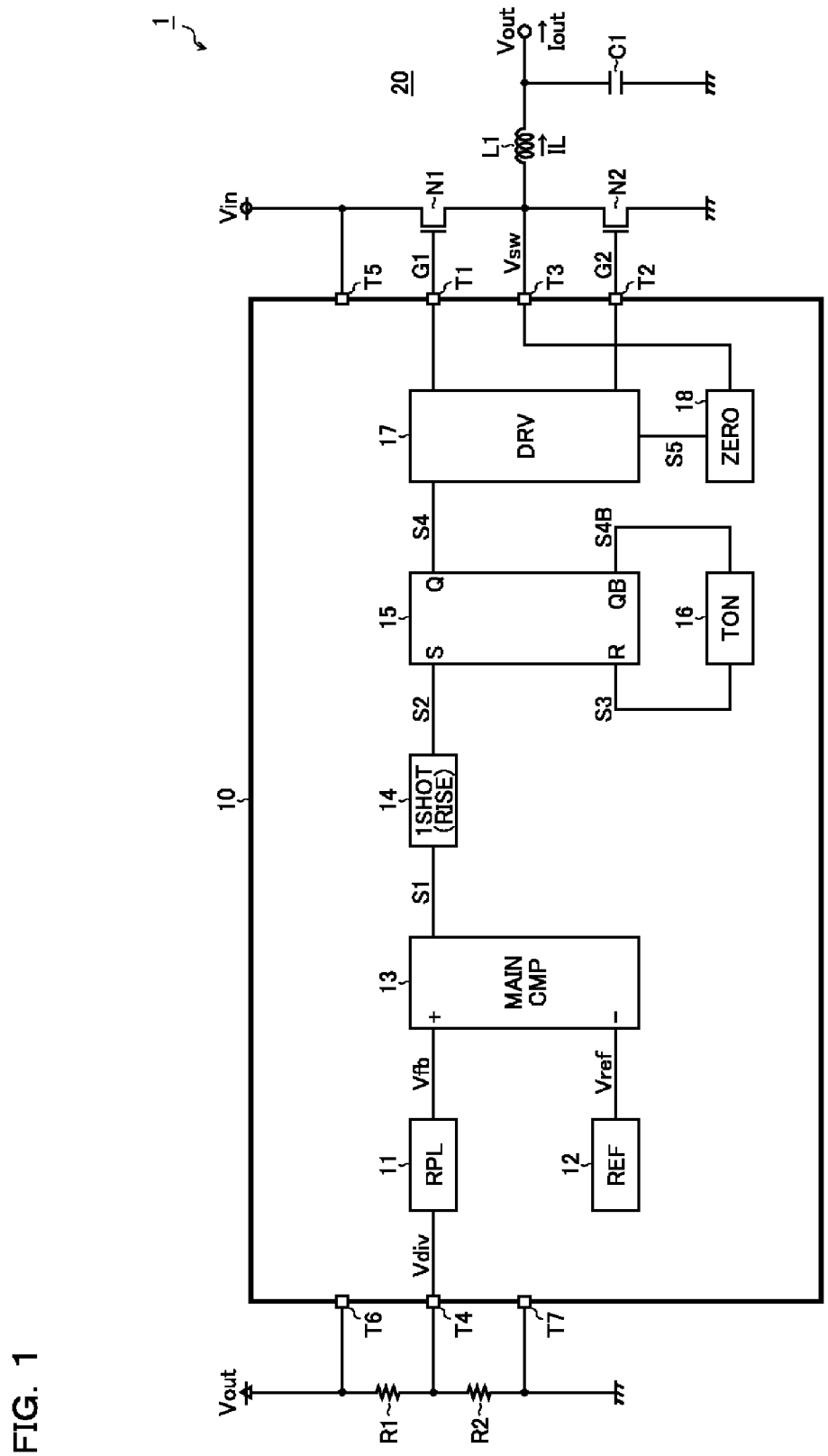
FIG. 1 is a block diagram showing an overall configuration of a switching power supply device.

Switching Power Supply Device: FIG. 1 is a block diagram showing an overall configuration of a switching power supply device. In this configuration example, the switching power supply device 1 is a step-down DC/DC converter that generates an output voltage Vout from an input voltage Vin by a non-linear control method (a bottom-detecting fixed-ON-period method). The switching power supply device 1 is composed of a semiconductor device 10 and a switching output stage 20, the latter including various discrete components externally fitted to the semiconductor device 10 (N-channel MOS (metal oxide semiconductor) field-effect transistors N1 and N2, a coil L1, a capacitor C1, and resistors R1 and R2).

The semiconductor device 10 is the principal component (a so-called power control IC) that controls the overall operation of the switching power supply device 1 in a comprehensive fashion. The semiconductor device 10 has, as means for establishing electrical connection with outside the device, external terminals T1 to T7 (an upper gate terminal T1, a lower gate terminal T2, a switching terminal T3, a feedback terminal T4, an input voltage terminal T5, an output voltage terminal T6, and a ground terminal T7).

The external terminal T1 is connected to a gate of the transistor N1. The external terminal T2 is connected to a gate of the transistor N2. The external terminal T3 is connected to an application terminal of a switching voltage Vsw (the connection node between a source of the transistor N1 and a drain of the transistor N2). The external terminal T4 is connected to an application terminal of a divided voltage Vdiv (the connection node between the resistors R1 and R2). The external terminal T5 is connected to an application terminal of an input voltage Vin. The external terminal T6 is connected to an application terminal of an output voltage Vout. The external terminal T7 is connected to a ground terminal.

Next, a description will be given of the interconnection among the discrete components externally fitted to the semiconductor device 10. A drain of the transistor N1 is connected to the application terminal of the input voltage Vin. A source of the transistor N2 is connected to the ground terminal. The source of the transistor N1 and the drain of the transistor N2 are both connected to a first end of the coil L1. A second end of the coil L1 and a first end of the capacitor C1 are both connected to the application terminal of the output voltage Vout. A second end of the capacitor C1 is connected to the ground terminal. The resistors R1 and R2 are connected in series between the application terminal of the output voltage Vout and the ground terminal.

The transistor N1 is an output transistor which is turned ON and OFF according to a gate signal G1 fed in via the external terminal T1. The transistor N2 is a synchronous rectification transistor which is turned ON and OFF according to a gate signal G2 fed in via the external terminal T2. As a rectification device, a diode may be used instead of the transistor N2. The transistors N1 and N2 may be integrated into the semiconductor device 10. The coil L1 and the capacitor C1 function as a rectifier/smoother which rectifies and smooths a switching voltage Vsw having a square waveform and appearing at the external terminal T3 to produce the output voltage Vout. The resistors R1 and R2 function as a divided voltage generator which divides the output voltage Vout to produce a divided voltage Vdiv. Provided that the output voltage Vout falls within the input dynamic range of a ripple injection circuit 11 (or a main comparator 13), the divided voltage generator may be omitted.

Next, a description will be given of the internal configuration of the semiconductor device 10. The semiconductor device 10 has integrated in it a ripple injection circuit 11, a reference voltage generation circuit 12, a main comparator 13, a one-shot pulse generation circuit 14, an RS flip-flop 15, an ON-period setting circuit 16, a gate driver circuit 17, and a reverse current detection circuit 18.

The ripple injection circuit 11 adds to the divided voltage Vdiv a ripple voltage Vrpl (a pseudo-ripple component that imitates a coil current IL through the coil L1) to produce a feedback voltage Vfb (=Vdiv+Vrpl). The introduction of such a ripple injection technique allows stable switching control even when the output voltage Vout (and hence the divided voltage Vdiv) does not contain a very large ripple component, and allows the use of a laminated ceramic capacitor, which has a low ESR, as the capacitor C1. In a case where the output voltage Vout contains a sufficiently large ripple component, the ripple injection circuit 11 may be omitted.

The reference voltage generation circuit 12 generates a predetermined reference voltage Vref.

The main comparator 13 compares the feedback voltage Vfb, which is fed to an inverting input terminal (−) of the main comparator 13, with the reference voltage Vref, which is fed to a non-inverting input terminal (+) of the main comparator 13, to produce a comparison signal S1. The comparison signal S1 is at low level when the feedback voltage Vfb is higher than the reference voltage Vref, and is at high level when the feedback voltage Vfb is lower than the reference voltage Vref.

The one-shot pulse generation circuit 14 is triggered by a falling edge in the comparison signal S1 to produce a one-shot pulse (e.g., a falling pulse) in a set signal S2.

The RS flip-flop 15 sets an output signal S4 to high level at a pulse edge (e.g., falling edge) in the set signal S2, which is fed to a set terminal (S) of the RS flip-flop 15, and resets the output signal S4 to low level at a pulse edge (e.g., falling edge) in a reset signal S3, which is fed to a reset terminal (R) of the RS flip-flop 15.

The ON-period setting circuit 16 produces a one-shot pulse (e.g., falling pulse) in the reset signal S3 at the lapse of a predetermined ON period Ton after an inverted output signal S4B (a logic inversion signal of the output signal S4) from the RS flip-flop 15 is dropped to low level.

The gate driver circuit 17 produces the gate signals G1 and G2 according to the output signal S4 from the RS flip-flop 15 so as to make the transistors N1 and N2 perform complementary switching. In the present specification, "complementary" refers not only to the transistors N1 and N2 operating with their respective ON/OFF states completely reversed but also to their operating with a delay in their ON/OFF transition timing with a view to preventing a through current (with a so-called simultaneously OFF period (dead time) inserted).

The reverse current detection circuit 18 watches for reversal of the coil current IL (a coil current IL from the coil L1 via the transistor N2 to the ground terminal) to produce a reverse current detection signal S5. The reverse current detection signal S5 is latched at high level (the logic level that indicates detection of reversal) on detection of reversal of the coil current IL, and is reset to low level (the logic level that indicates no detection of reversal) at a rising edge in the gate signal G1 in the next cycle. For example, one method for watching for reversal of the coil current IL is by detecting a zero-cross point at which the switching voltage Vsw turns from negative to positive during the ON period of the transistor N2. When the reverse current detection signal S5 is at high level, the gate driver circuit 17 generates the gate signal G2 so as to forcibly turn OFF the transistor N2 irrespective of the output signal S4.

The ripple injection circuit 11, the reference voltage generation circuit 12, the main comparator 13, the one-shot pulse generation circuit 14, the RS flip-flop 15, the ON-period setting circuit 16, the gate driver circuit 17, and the reverse current detection circuit 18 function as a non-linear-control (in the configuration example being discussed, bottom-detection fixed-ON-period) switching control circuit that produces the output voltage Vout from the input voltage Vin by turning ON and OFF the transistors N1 and N2 according to the result of comparison of the feedback voltage Vfb with the reference voltage Vref.

Figure 2:
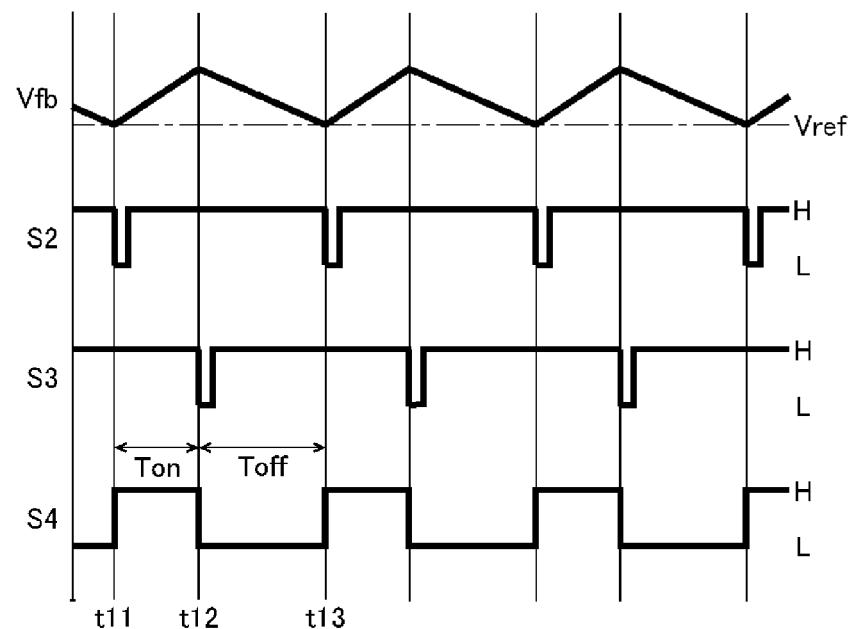
FIG. 2 is a timing chart showing switching operation under a heavy load.

Switching Operation: FIG. 2 is a timing chart showing switching operation under a heavy load (in a continuous-current mode), depicting, from top to bottom, the feedback voltage Vfb, the set signal S2, the reset signal S3, and the output signal S4.

At time point t11, when the feedback voltage Vfb falls down to the reference voltage Vref, the set signal S2 falls to low level, and the output signal S4 turns to high level. Accordingly, the transistor N1 turns ON, and the feedback voltage Vfb starts to rise.

At the lapse of an ON period Ton thereafter, at time point t12, when the reset signal S3 falls to low level, the output signal S4 turns to low level. Accordingly, the transistor N1 turns OFF, and the feedback voltage Vfb starts to fall again.

The gate driver circuit 17 produces the gate signals G1 and G2 according to the output signal S4, and use them to turn ON and OFF the transistors N1 and N2. Specifically, when the output signal S4 is at high level, basically the gate signal G1 is at high level so that the transistor N1 is ON, and the gate signal G2 is at low level so that the transistor N2 is OFF. Conversely, when the output signal S4 is at low level, basically, the gate signal G1 is at low level so that the transistor N1 is OFF, and the gate signal G2 is at high level so that the transistor N2 is ON.

As the transistors N1 and N2 are turned ON and OFF as described above, a switching voltage Vsw having a square waveform appears at the external terminal T3. The switching voltage Vsw is rectified and smoothed by the coil L1 and the capacitor C1 to produce the output voltage Vout. The output voltage Vout is divided by the resistors R1 and R2 to produce the divided voltage Vdiv (and hence the feedback voltage Vfb). With output feedback control like this, the switching power supply device 1 produces the desired output voltage Vout from the input voltage Vin with an extremely simple configuration.

Figure 3:
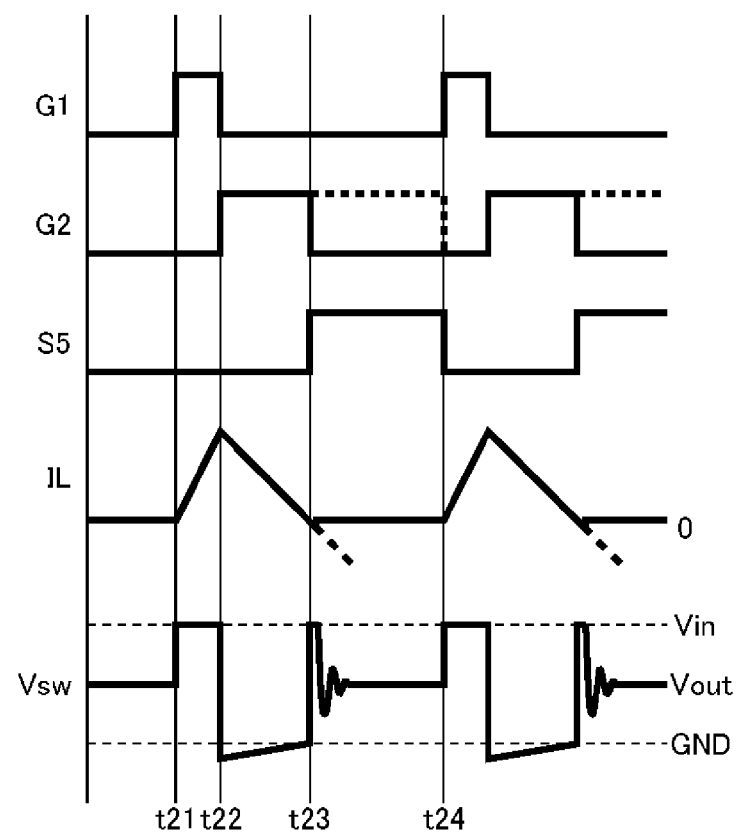
FIG. 3 is a timing chart showing reverse current cut-off operation under a light load.

Reverse Current Cut-Off Operation: FIG. 3 is a timing chart showing reverse current cut-off operation under a light load (in a discontinuous-current mode), depicting, from top to bottom, the gate signals G1 and G2, the reverse current detection signal S5, the coil current IL, and the switching voltage Vsw.

Between time points t21 and t22, the gate signal G1 is at high level, and the gate signal G2 is at low level; thus, the transistor N1 is ON, and the transistor N2 is OFF. Accordingly, between time points t21 and t22, the switching voltage Vsw remains approximately equal to the input voltage Vin, and the coil current IL increases.

At time point t22, when the gate signal G1 is dropped to low level and the gate signal G2 is raised to high level, the transistor N1 turns OFF, and the transistor N2 turns ON. Accordingly, the switching voltage Vsw falls to a negative voltage (=GND−IL×RN2, where RN2 represents the ON-state resistance of the transistor N2), and the coil current IL starts to decrease.

Here, when an output current Tout through a load is sufficiently high, that is, under a heavy load, the coil L1 stores a large amount of energy; thus, until time point t24, when the gate signal G1 is raised back to high level, the coil current IL continues to pass toward the load without falling below a zero value, and the switching voltage Vsw is kept at a negative voltage. On the other hand, when the output current Tout through the load is low, that is, under a light load, the coil L1 stores a small amount of energy; thus, at time point t23, the coil current IL falls below a zero value, and reversal of the coil current IL occurs, causing the polarity of the switching voltage Vsw to switch from negative to positive. This state is tantamount to feeding the electric charge stored in the capacitor C1 via the coil L1 back to the input side, and results in low efficiency under a light load.

As a solution, the switching power supply device 1 detects reversal of the coil current IL (reversal of the polarity of the switching voltage Vsw) by use of the reverse current detection circuit 18 to forcibly turns OFF the transistor N2 in a period in which the reverse current detection signal S5 is at high level (between time points t23 and t23). With this configuration, the reversed coil current IL can be cut off promptly. It is thus possible to overcome a drop in efficiency under a light load.

On-Period Setting Circuit: Next, with reference to FIGS. 4 and 5, the basic design concept of the ON-period setting circuit 16 will be described.

Figure 4:
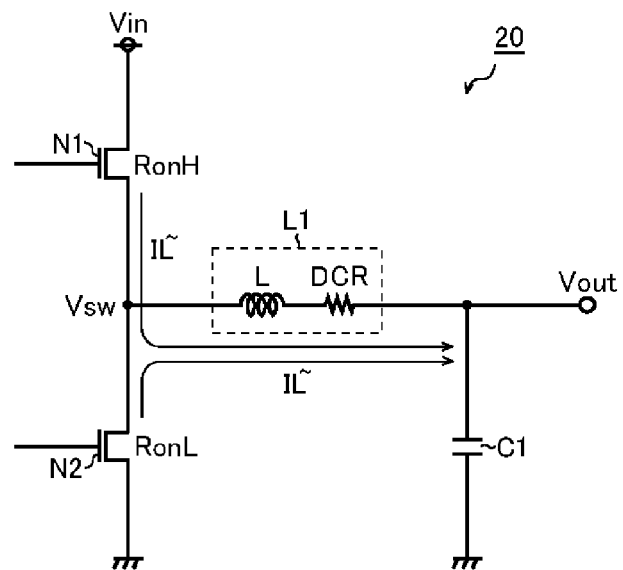
FIG. 4 is a characteristics diagram of a switching output stage 20.

FIG. 4 is a characteristics diagram of the output stage 20. In FIG. 4, L represents the inductance of the coil L1, DCR represents the equivalent serial resistor of the coil L1, RonH represents the ON-state resistance of the transistor N1, RonL represents the ON-state resistance of the transistor N2, and IL̃ represents the average value of the coil current IL.

Figure 5:
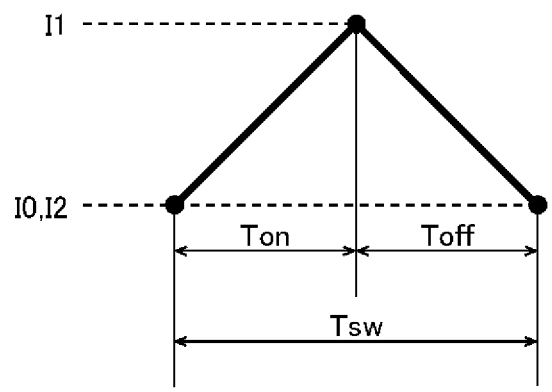
FIG. 5 is a schematic diagram showing a behavior of a coil current IL.

FIG. 5 is a schematic diagram showing the behavior of the coil current IL within a switching cycle Tsw. As shown in FIG. 5, the coil current IL increases from a current value I0 to a current value I1 over an ON period Ton (a period in which the transistor N1 is ON and the transistor N2 is OFF), and thereafter decreases from a current value I1 to a current value I2 over an OFF period (a period in which the transistor N1 is OFF and the transistor N2 is ON). The current values I1 and I2 are given respectively by formula (1a) and (1b) below.

$$I1 = I0 + Ton \cdot \frac{Vin - Vout - (RonH + DCR) \cdot I\tilde{L}}{L} \quad (1a)$$

$$I2 = I1 + Toff \cdot \frac{Vout + (RonL + DCR) \cdot I\tilde{L}}{L} \quad (1b)$$

In a steady state, I0=I2 holds. Substituting this in formulae (1a) and (1b) and rearranging the resulting formulae gives formula (2) below.

$$Tsw = Ton + Toff = Ton \cdot \frac{Vin - (RonH - RonL) \cdot I\tilde{L}}{Vout + (RonL + DCR) \cdot I\tilde{L}} \quad (2)$$

Formula (2) above reveals that the switching cycle Tsw (and hence the switching frequency fsw (=1/Tsw)) can be made constant by taking as the ON period Ton the time required to charge the capacitor from 0 V to Vout+(RonL+DCR)×IL̃ with a current that is proportional to Vin−(RonH−RonL)×IL̃.

Here, Vin−RonH×IL̃ corresponds to the high level VswH of the switching voltage Vsw (i.e., its voltage level during the ON period Ton), −RonL×IL̃ corresponds to the low level VswL of the switching voltage Vsw (i.e., its voltage level during the OFF period Toff), and Vout+DCR×IL̃ corresponds to an average potential of the switching voltage Vsw (hereinafter referred to as the average switch voltage Vsw̃).

Accordingly, if it is assumed that Vin−RonH>>−RonL×IL̃, the switching cycle Tsw can be made constant by designing the ON-period setting circuit 16 such that first the capacitor is kept at the low level VswL of the switching voltage Vsw (=−RonL×IL$^{18}$ ) during the OFF period Toff, then, at the time point at which the transistor N1 is turned ON, the capacitor starts to be charged with a current that is proportional to the high level VswH of the switching voltage Vsw (=Vin−RonH×IL$^{18}$ ), and the time required until the capacitor potential reaches the average switch voltage Vsw̃ is taken as the ON period Ton.

Figure 6:
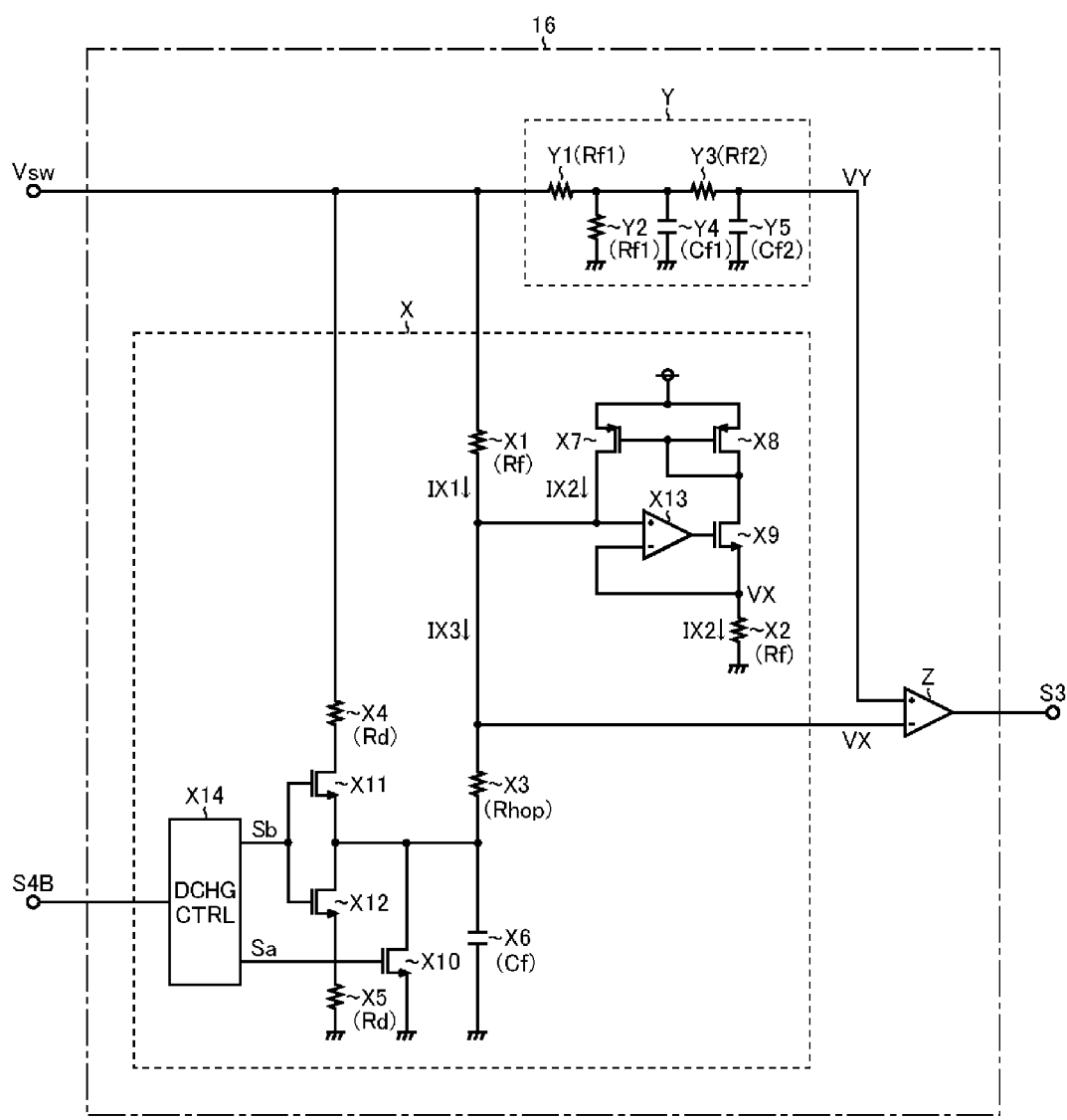
FIG. 6 is a circuit diagram showing a basic configuration of an ON-period setting circuit 16.

FIG. 6 is a circuit diagram showing the basic configuration of the ON-period setting circuit 16 designed according to the above design concept. In this configuration, the ON-period setting circuit 16 example includes a first voltage generator X, a second voltage generator Y, and a comparator Z.

The first voltage generator X receives the switching voltage Vsw and the inverted output signal S4B, and produces a first voltage VX having a ramp waveform (or a triangular or sloping waveform). The first voltage VX increases from an initial value at a predetermined gradient during an ON period Ton (a period in which the inverted output signal S4B is at low level), and is reset to the initial value in an OFF period Toff (a period in which the inverted output signal S4B is at high level).

The second voltage generator Y receives the switching voltage Vsw, and produces a second voltage VY. The second voltage VY corresponds to the reference voltage for the comparator Z.

The comparator Z compares the first voltage VX, which is fed from the first voltage generator X to an inverting input terminal (−) of the comparator Z, with the second voltage VY, which is fed from the second voltage generator Y to a non-inverting input terminal (+) of the comparator Z, to produce the reset signal S3. The reset signal S3 is at low level when the first voltage VX is higher than the second voltage VY, and is at high level when the first voltage VX is lower than the second voltage VY. A falling edge in the reset signal S3 serves as a trigger that signals the end of an ON period Ton.

Next, with reference to FIG. 6, the circuit configuration of the first voltage generator X will be described in detail. The first voltage generator X includes resistors X1 to X5, a capacitor X6, P-channel MOS (metal-oxide-semiconductor) field-effect transistors X7 and X8, N-channel MOS field-effect transistors X9 to X12, an operational amplifier X13, and a discharge controller X14.

A first end of the resistor X1 (with a resistance value Rf) is connected to an input terminal of the switching voltage Vsw. A second end of the resistor X1 and a first end of the resistor X3 (with a resistance value Rhop) are both connected to an output terminal of the first voltage VX (i.e., the inverting input terminal (−) of the comparator Z). A second end of the resistor X3 is connected to a first end of the capacitor X6 (with a capacitance value Cf). A second end of the capacitor X6 is connected to a ground terminal.

A non-inverting input terminal (+) of the operational amplifier X13 is connected to the output terminal of the first voltage VX. An output terminal of the operational amplifier X13 is connected to a gate of the transistor X9. A drain of the transistor X9 is connected to an inverting input terminal (−) of the operational amplifier X13 and to a first end of the resistor X2 (with a resistance value Rf). A second end of the resistor X2 is connected to the ground terminal. Sources of the transistors X7 and X8 are both connected to a supply power terminal. Gates of the transistors X7 and X8 are both connected to a drain of the transistor X8. A drain of the transistor X7 is connected to the output terminal of the first voltage VX. The drain of the transistor X8 is connected to the drain of the transistor X9.

A drain of the transistor X10 is connected to a first end of the capacitor X6. A source of the transistor X10 is connected to the ground terminal. A gate of the transistor X10 is connected to a first output terminal of the discharge controller X14 (i.e., an output terminal of a first discharge control signal Sa). A first end of the resistor X4 (with a resistance value Rd) is connected to an input terminal of the switching voltage Vsw. A second end of the resistor X4 is connected to a drain of the transistor X11. A source of the transistor X11 and a drain of the transistor X12 are both connected to a first end of the capacitor X6. A source of the transistor X12 is connected to a first end of the resistor X5 (with a resistance value Rd). A second end of the resistor X5 is connected to the ground terminal. Gates of the transistors X11 and X12 are both connected to a second output terminal of the discharge controller X14 (i.e., an output terminal of a second discharge control signal Sb). The discharge controller X14 is fed with the inverted output signal S4B.

In the first voltage generator X configured as described above, the resistors X1 and X2, the transistors X7 to X9, and the operational amplifier X13 constitute a charge circuit for the capacitor X6. The resistor X1 has a first current IX1 (=(Vsw−VX)/Rf) that is commensurate with the difference between the switching voltage Vsw and the first voltage VX. The operational amplifier X13 controls the gate of the transistor X9 such that the non-inverting input terminal (+) and inverting input terminal (−) of the operational amplifier X13 are short-circuited together on an imaginary basis, and thus the first voltage VX appears at the first end of the resistor X2. Accordingly, the resistor X2 has a second current IX2 (=VX/Rf) that is commensurate with the first voltage VX. The transistors X7 and X8 constitute a current mirror, which mirrors the second current IX2 and adds it to the first current IX1 to produce a third current I3 (=Vsw/Rf) that is commensurate with the switching voltage Vsw.

During a period in which the inverted output signal S4B is at low level (i.e., during an ON period Ton), the discharge controller X14 keeps the transistors X10 to X12 all OFF, and thus the discharge path for the capacitor X6 is cut off. Accordingly, the third current I3 charges the capacitor X6, and thus the first voltage VX increases.

When the capacitor X6 is charged, the first voltage VX starts to rise from zero, and thus the second current IX2 too starts to rise from zero. Accordingly, a slight delay at start-up does not much affect the ON period Ton.

The resistor X3 produces a compensation voltage for compensating for a signal delay time that is produced by the main comparator 13, the gate driver circuit 17, etc. Providing this resistor X3 makes it possible to compensate for a delay time that corresponds to Cf×Rhop. Varying the resistance value Rhop of the resistor X3 varies the input voltage dependence (Vin dependence) of the switching frequency fsw. Accordingly, it is preferable that the resistance value Rhop of the resistor X3 be adjusted to an optimum value in view of the results of previous evaluation.

Moreover, in the first voltage generator X configured as described above, the resistors X4 and X5, the transistors X10 to X12, and the discharge controller X14 constitute a charge circuit for the capacitor X6. During a period in which the inverted output signal S4B is at high level (i.e., during an OFF period Toff), first, over a predetermined minimum OFF time (e.g., 100 ns), the discharge controller X14 keeps the transistor X10 ON to keep the transistors X11 and X12 OFF. As a result, the capacitor X6 is discharged quickly via the transistor X10 down to the GND potential (=0 V).

Thereafter, the one-shot pulse generation circuit 14 turns OFF the transistor X10 to turn ON the transistors X11 and X12. As a result, the capacitor X6 is discharged further down to a negative voltage (=VswL/2) which results from the low level VswL of the switching voltage Vsw being divided to one-half.

When the transistor N2 is forcibly turned OFF (to cut off a reverse current) in the discontinuous-current mode, the transistors N1 and N2 are both OFF, and thus the switching voltage Vsw remains approximately equal to the output voltage Vout. Accordingly, if the transistors X11 and X12 are ON as described above, during an OFF period Toff, the capacitor X6 is charged up to one-half of the output voltage Vout. This hampers the subsequent ON time setting operation (involving a comparison between the first and second voltages VX and VY). To avoid that, in the discontinuous-current mode, the discharge controller X14 controls discharging in such a way as to keep the first voltage VX constant at the GND potential (=0V) over a period in which the inverted output signal S4B is at high level. Specifically, over a period in which the inverted output signal S4B is at high level, the transistor X10 is kept ON, and the transistors X11 and X12 are kept OFF.

Next, with reference to FIG. 6, the circuit configuration of the second voltage generator Y will be described in detail. The second voltage generator Y includes resistors Y1 to Y3 and capacitors Y4 and Y5.

A first end of the resistor Y1 (with a resistance value Rf1) is connected to the input terminal of the switching voltage Vsw. A second end of the resistor Y1 is connected to a first end of the resistor Y2 (with a resistance value Rf1), to a first end of the resistor Y3 (with a resistance value Rf2), and to a first end of the capacitor Y4 (with a capacitance value of Cf1). A second end of the resistor Y2 and a second end of the capacitor Y4 are both connected to the ground terminal. A second end of the resistor Y3 and a first end of the capacitor Y5 (with a capacitance value of Cf2) are both connected to an output terminal of the second voltage VY (i.e., the non-inverting input terminal (+) of the comparator Z). A second end of the capacitor Y5 is connected to the ground terminal.

In the second voltage generator Y configured as described above, the resistors Y1 and Y2 function as a voltage division circuit that produces a divided voltage (=Vsw/2) of the switching voltage Vsw. The resistors Y1 and Y3 and the capacitors Y4 and Y5 function as an RC low-pass filter (RC integration circuit) of order 2 that integrates the divided voltage (=Vsw/2) of the switching voltage Vsw to produce the second voltage VY. In this configuration example, the second voltage generator Y produces a second voltage VY (=Vsw˜/2) which corresponds to one-half of the average switch voltage Vsw˜

The order of the RC low-pass filter is not limited to 2; it may instead be 1, or 3 or more.

In a case where the second voltage VY is produced without the switching voltage Vsw being divided, there is no need for the resistors Y2, X4 and X5 and the transistor X10. This, however, leads to large variation in the first voltage VX, and thus, in a case where a high input voltage Vin is dealt with, attention needs to be paid to the withstand voltage design of the ON-period setting circuit 16.

Figure 7:
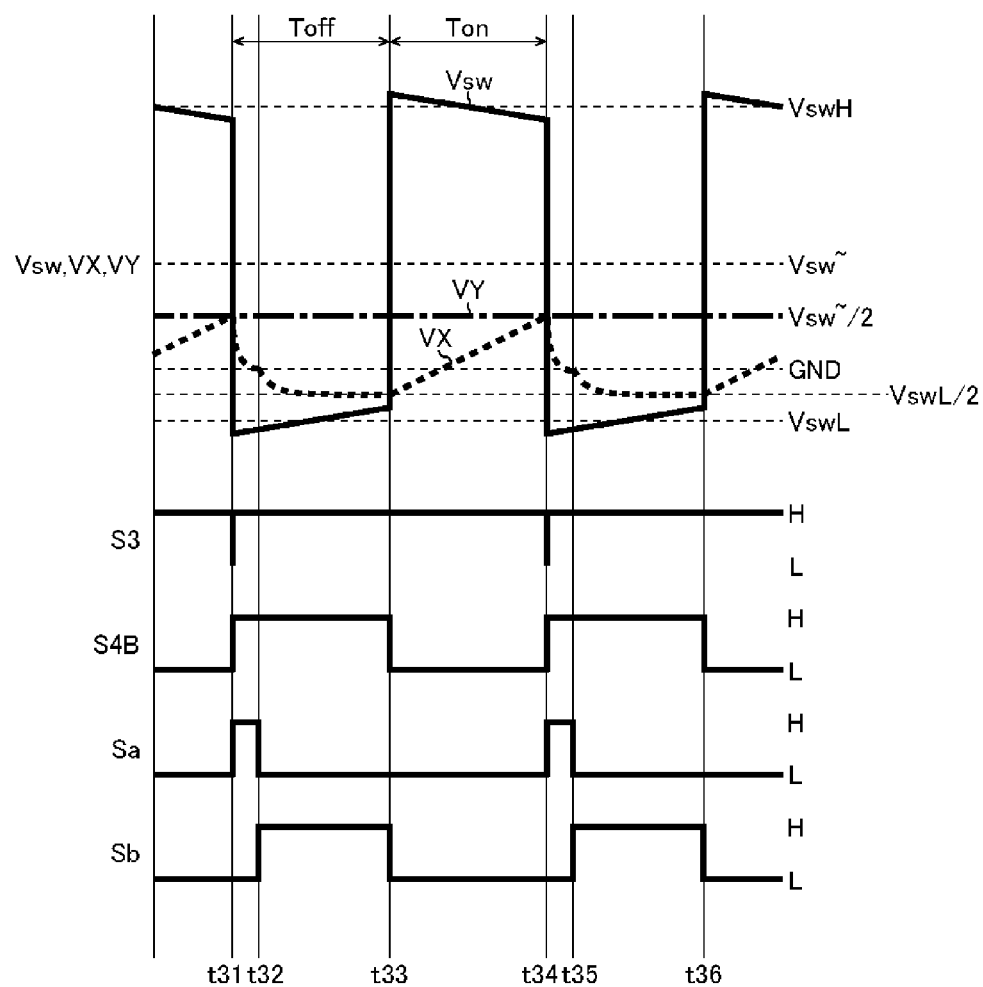
FIG. 7 is a timing chart showing basic operation of an ON-period setting circuit 16.

FIG. 7 is a timing chart showing the basic operation of the ON-period setting circuit 16, depicting, from top to bottom, the switching voltage Vsw, the first voltage VX, the second voltage VY, the reset signal S3, the inverted output signal S4B, the first discharge control signal Sa, and the second discharge control signal Sb.

The period from time point t31 to time point t33 corresponds to a period in which the inverted output signal S4B is at high level (i.e., an OFF period Toff). During this period, first, over the period from time point t31 to time point t33, the first discharge control signal Sa is kept at high level, and the second discharge control signal Sb is kept at low level. As a result, the transistor X10 remains ON, and the transistors X11 and X12 remain OFF; thus the first voltage VX is discharged quickly down to the GND potential (=0 V).

Subsequently, from time point t32 to time point t33, the first discharge control signal Sa is kept at low level, and the second discharge control signal Sb is kept at high level. As a result, the transistor X10 remains OFF, and the transistors X11 and X12 remain ON; thus the first voltage VX is discharged further down to a divided voltage (=VswL/2) which results from the low level VswL of the switching voltage Vsw being divided to one-half.

On the other hand, the period from time point t33 to time point t34 corresponds to a period in which the inverted output signal S4B is at low level (i.e., an ON period Ton). During this period, the first and second discharge control signals Sa and Sb both remain at low level. As a result, the discharge path of the capacitor X6 is cut off; thus, the third current I3 proceeds with the charging of the capacitor X6, and the first voltage VX increases. Then, at time point t34, when the first voltage VX becomes higher than the second voltage VY, the reset signal S3 falls to low level, and the ON period Ton ends. After time point t34, operation similar to that described above is repeated.

As described above, the ON-period setting circuit 16 is designed to operate as follows: during an OFF period Toff, it discharges the capacitor X6 to an initial value (=VswL/2) commensurate with the low level VswL of the switching voltage Vsw; thereafter, at the time point that the transistor N1 is turned ON, it starts to charge the capacitor X6 with the third current I3 which is proportional to the high level VswH of the switching voltage Vsw, and it takes as the ON period Ton the time required until the first voltage VX reaches the second voltage VY (=one-half of the average switch voltage Vsw˜).

With this configuration, it is possible to suppress variation in the switching frequency fsw without spoiling the advantages of non-linear control. It is thus possible to improve output voltage precision and load regulation characteristics, and to simplify measures against EMI (electromagnetic interference) and noise. It is also possible to apply the switching power supply device 1 suitably as a power supply in applications where the input voltage Vin varies greatly or different output voltages Vout are required.

Figure 8:
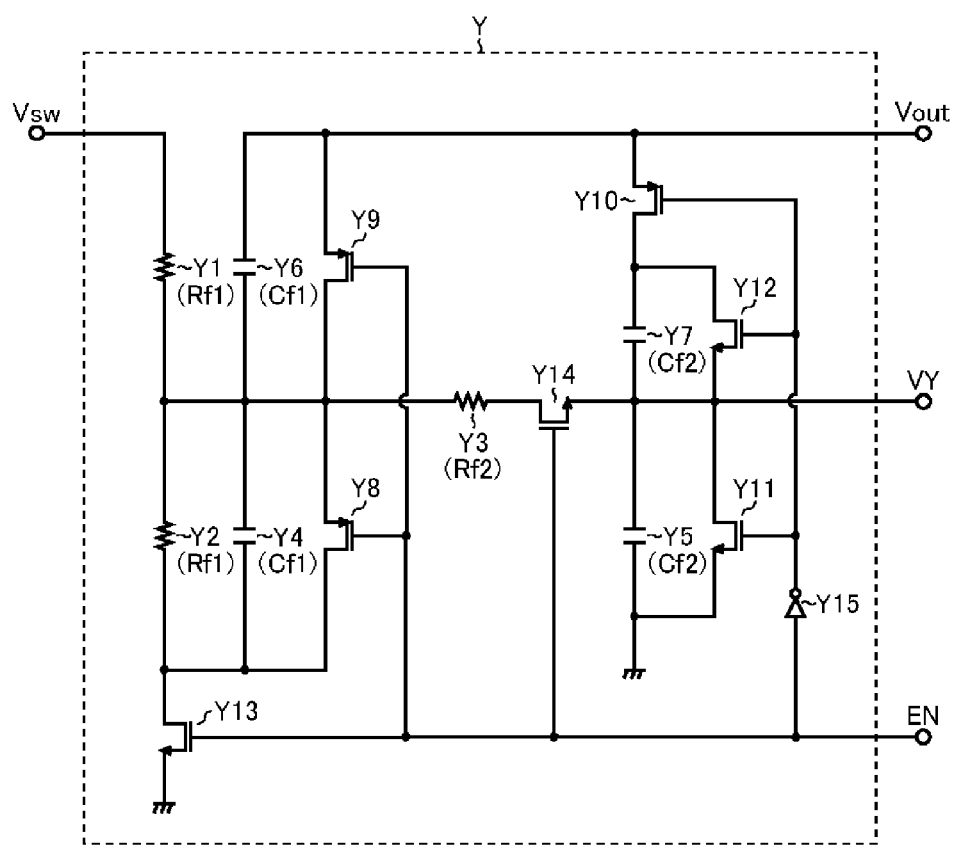
FIG. 8 is a circuit diagram showing a first modified example of a second voltage generator Y.

Second Voltage Generator (First Modified Example): FIG. 8 is a circuit diagram showing a first modified example of the second voltage generator Y. The second voltage generator Y in this modified example is based on the basic configuration (FIG. 6) described previously, and further includes capacitors Y6 and Y7, P-channel MOS field-effect transistors Y8 to Y10, N-channel MOS field-effect transistors Y11 to Y14, and an inverter Y15. Accordingly, such circuit elements as find their counterparts in the basic configuration described previously are identified by the same reference signs as in FIG. 6, and no overlapping description will be repeated. The following description thus focuses on distinctive features of the first modified example.

A first end of the capacitor Y6 (with a capacitance value Cf1) is connected to an input terminal of the output voltage Vout. A second end of the capacitor Y6 is connected to the first end of the capacitor Y4.

The second end of the resistor Y2 and the second end of the capacitor Y4 are not connected to the ground terminal, but are connected to a drain of the transistor Y13. A source of the transistor Y13 is connected to the ground terminal. A gate of the transistor Y13 is connected to an input terminal of an enable signal EN. In this way, the transistor Y13 is inserted between, at one end, the resistor Y2 and the capacitor Y4 and, at the other end, the ground terminal.

A source of the transistor Y8 is connected to the first end of the capacitor Y4. A drain of the transistor Y8 is connected to the second end of the capacitor Y4. A gate of the transistor Y8 is connected to the input terminal of the enable signal EN.

A source of the transistor Y9 is connected to the first end of the capacitor Y6. A drain of the transistor Y9 is connected to the second end of the capacitor Y6. A gate of the transistor Y9 is connected to the input terminal of the enable signal EN.

The second end of the resistor Y3 is not connected to the output terminal of the second voltage VY, but to a drain of the transistor Y14. A source of the transistor Y14 is connected to the output terminal of the second voltage VY. A gate of the transistor Y14 is connected to the input terminal of the enable signal EN. In this way, the transistor Y14 is inserted between the second end of the resistor Y3 and the output terminal of the second voltage VY.

A first end of the capacitor Y7 (with a capacitance value Cf2) is connected to a drain of the transistor Y10. A second end of the capacitor Y7 is connected to the first end of the capacitor Y5.

A source of the transistor Y10 is connected to an output terminal of the output voltage Vout. A drain of the transistor Y10 is connected to the first end of the capacitor Y7. A gate of the transistor Y10 is connected to an output terminal of the inverter Y15.

A drain of the transistor Y11 is connected to the first end of the capacitor Y5. A source of the transistor Y11 is connected to the second end of the capacitor Y5. A gate of the transistor Y11 is connected to the output terminal of the inverter Y15. An input terminal of the inverter Y15 is connected to the input terminal of the enable signal EN.

A drain of the transistor Y12 is connected to the first end of the capacitor Y7. A source of the transistor Y12 is connected to the second end of the capacitor Y7. A gate of the transistor Y12 is connected to the output terminal of the inverter Y15.

The enable signal EN is a logic signal that turns to low level when switching stops (i.e., when reversal of the coil current IL is detected and the transistors N1 and N2 are both OFF) and that turns to high level when switching restarts (i.e., when the transistor N1 is turned ON in the next cycle). The reverse current detection signal S5 mentioned previously can be diverted as the enable signal EN.

When the enable signal EN is at low level, the transistors Y13 and Y14 are OFF, and the current path through the resistors Y1 and Y2 and the current path through the resistor Y3 are both cut off. Thus, the transistors Y13 and Y14 function as a current path breaker that, when switching stops, cuts off the current path from the input terminal of the switching voltage Vsw to the ground terminal. With this configuration, it is possible to save power when no switching is taking place.

Inconveniently, with the above-mentioned current paths cut off, the second voltage VY remains equal to the GND potential (=0 V). Thus, when switching restarts, the second voltage VY needs to be raised quickly back to its original value (=Vsw~/2). However, the integrating of the switching voltage Vsw by the RC low-pass filter takes long time to restore the second voltage VY, and this hampers the On period setting operation.

On the other hand, in a steady state, the average switch voltage Vsw~ is largely equal to the output voltage Vout. With this taken into consideration, the second voltage generator Y in this configuration example includes a pull-up circuit that, when switching restarts, capacitively divides the output voltage Vout and thereby instantaneously raises the second voltage VY to a predetermined initial value VY0 (Vout/2≈Vsw~/2).

More specifically, in the second voltage generator Y in this configuration example, for the capacitors Y4 and Y5 in the RC low-pass filter, the capacitors Y6 and Y7 are connected in series with them respectively. That is, between the input terminal of the output voltage Vout and the ground terminal, there are connected a first capacitive voltage division circuit comprising the capacitors Y4 and Y6 and a second capacitive voltage division circuit comprising the capacitors Y5 and Y7. These two capacitive voltage division circuits function as a pull-up circuit.

When the enable signal EN rises from low level to high level and the transistor Y13 turns ON, a capacitively divided voltage (=Vout/2) appears at the connection node between the capacitors Y4 and Y6. Likewise, when the enable signal EN rises from low level to high level and the transistor Y10 turns ON, a capacitively divided voltage (=Vout/2) appears at the connection node between the capacitors Y5 and Y7.

With this configuration, when switching restarts, it is possible to raise the second voltage VY up to the predetermined initial value VY0 (=Vout/2) instantaneously without waiting for the integrating of the switching voltage Vsw by the RC low-pass filter. Once switching restarts, the second voltage VY settles at the voltage value at which it is supposed to be (the value resulting from the integrating by the RC low-pass filter, namely Vsw~/2) according to the time constant of the RC low-pass filter.

While the enable signal EN is at high level, the connection node between the resistors Y1 and Y2 is biased to Vout/2 by the first capacitive voltage division circuit, and the output terminal of the second voltage VY is biased to Vout/2 by the second capacitive voltage division circuit. Accordingly, the second voltage VY more easily follows variation in the output. It is thus possible to stabilize the behavior of the second voltage VY.

For the capacitors Y4 to Y7, the transistors Y8, Y9, Y11, and Y12 are connected in parallel with them respectively. These transistors Y8, Y9, Y11, and Y12 are all ON when the enable signal EN is at high level, and are all OFF when the enable signal EN is at low level.

Accordingly, when switching restarts and the enable signal EN is raised to high level, the capacitors Y4 to Y7 are each short-circuited across it, discharging the electric charge stored in it. With this configuration, it is possible to properly pull up the second voltage VY each time switching restarts.

Figure 9:
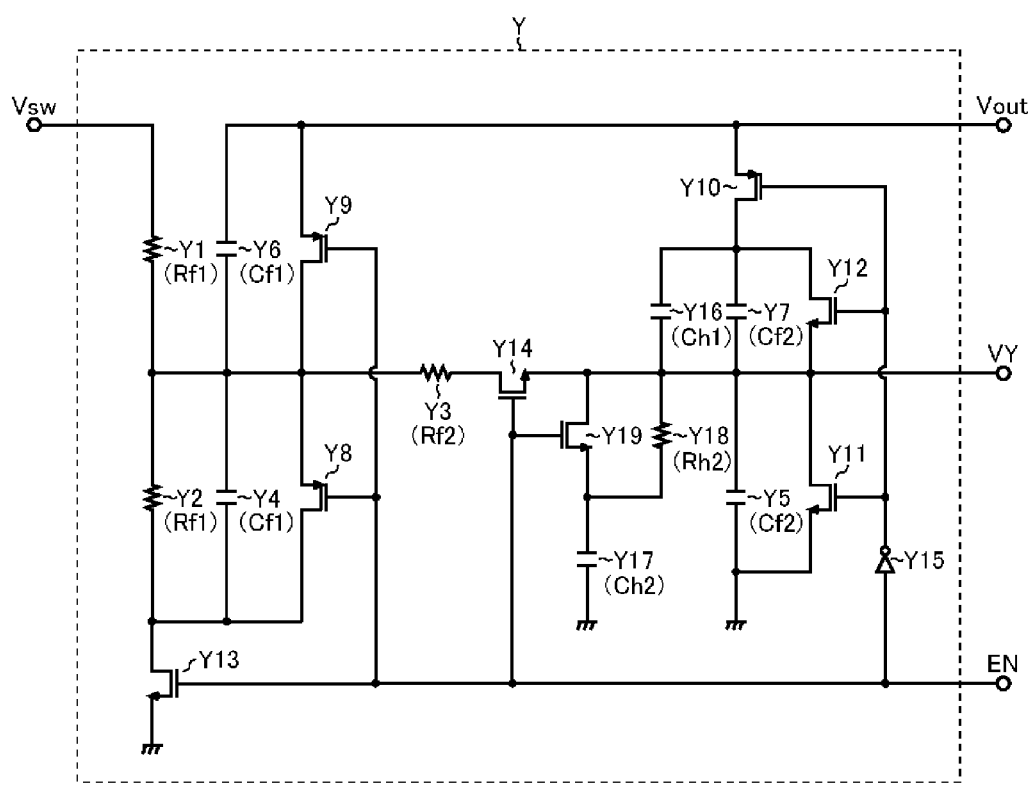
FIG. 9 is a circuit diagram showing a second modified example of a second voltage generator Y.

Second Voltage Generator (Second Modified Example): FIG. 9 is a circuit diagram showing a second modified example of the second voltage generator Y. The second voltage generator Y in this modified example is based on the first modified example (FIG. 8) described previously, and further includes, as additional circuit elements constituting a pull-up circuit, a resistor Y18, capacitors Y16 and Y17, and an N-channel MOS field-effect transistor Y19. Accordingly, such circuit elements as find their counterparts in the first modified example described previously are identified by the same reference signs as in FIG. 8, and no overlapping description will be repeated. The following description thus focuses on distinctive features of the second modified example.

A first end of the capacitor Y16 (with a capacitance value Ch1) is connected to the first end of the capacitor Y7. A second end of the capacitor Y16 and a first end of the resistor Y18 (with a resistance value Rh2) are both connected to the output terminal of the second voltage VY. A second end of the resistor Y18 is connected to a first end of the capacitor Y17 (with a capacitance value Ch2). A second end of the capacitor Y17 is connected to the ground terminal.

A drain of the transistor Y19 is connected to the first end of the reverse current detection circuit 18. A source of the transistor Y19 is connected to a second end of the resistor Y18. A gate of the transistor Y19 is connected to the input terminal of the enable signal EN.

The pull-up circuit in the second voltage generator Y is composed exclusively of passive devices and a switch; thus, it requires no bias current and can easily achieve zero stand-by current. Moreover, in principle, no delay at start-up occurs.

Next, a description will be given of ON period modulation operation achieved by use of the above-mentioned additional circuit elements (the capacitors Y16 and Y17, the reverse current detection circuit 18, and the transistor Y19). When the capacitor Y17 is ignored, the addition of the capacitor Y16 makes the initial value VY1 of the second voltage VY at the restart of switching equal to a voltage value given by formula (3) below. That is, the higher the capacitance value Ch1 of the resistor Y16 is, the higher the initial value VY1 of the second voltage VY is.

$$VY1 = \frac{Cf2 + Ch1}{2Cf2 + Ch1} \cdot Vout \quad (3)$$

On the other hand, when the capacitor Y16 is ignored, the addition of the capacitor Y17 makes the initial value VY2 of the second voltage VY at the restart of switching equal to a voltage value given by formula (4) below. That is, the higher the capacitance value Ch2 of the resistor Y17 is, the lower the initial value VY2 of the second voltage VY is.

$$VY2 = \frac{Cf2}{2Cf2 + Ch2} \cdot Vout \quad (4)$$

It should be noted, however, that formula (4) above holds only when, at the time point that switching restarts, the capacitor Y17 has been discharged completely, that is, when the low-level period of the enable signal EN (i.e., the OFF period of the transistor Y19) is longer than the time constant τ (=Ch2×Rh2) of the RC circuit composed of the capacitor Y17 and the resistor Y18.

The further the low-level period of the enable signal EN is shorter than the time constant τ, the more of the electric charge in the capacitor Y17 is left undischarged, and thus the smaller is the effect in reducing the initial value of the second voltage VY. That is, the effect of the capacitor Y17 in reducing the initial value of the second voltage VY is the greater the lighter the load is (i.e., the longer the low-level period of the enable signal EN is), and is the smaller the heavier the load is (i.e., the shorter the low-level period of the enable signal EN is).

The capacitors Y16 and Y17, each operating as described above, together operate as follows.

First, in a load region immediately before a transition from the continuous-current mode to the discontinuous-current mode, the low-level period of the enable signal EN is significantly shorter than the above-mentioned time constant τ, and the electric charge stored in the capacitor Y17 is hardly discharged. Thus, the capacitor Y17 can be ignored; accordingly, when switching restarts, the second voltage VY is pulled up to the initial value VY1 given by formula (3) above.

On the other hand, in the discontinuous-current mode, when the load becomes light enough to permit the capacitor Y17 to be discharged completely during the low-level period of the enable signal EN, the initial value VY3 of the second voltage VY at the restart of switching equals a voltage value given by formula (5) below. This state corresponds to a state where the output voltage Vout is capacitively divided by use of all the four capacitors (Y5, Y7, Y16, and Y17).

$$VY3 = \frac{Cf2 + Ch1}{2Cf2 + Ch1 + Ch2} \cdot Vout \quad (5)$$

It should be noted, however, that formula (5) above holds only when, at the time point that switching restarts, the capacitor Y17 has been discharged completely. The heavier the load is (i.e., the shorter the low-level period of the enable signal EN is), the more the initial value of the second voltage VY approaches VY1 from VY3.

Once switching restarts, the second voltage VY gradually settles from the initial value to the voltage value at which it is supposed to be (=Vsw~/2). After switching restarts, the first voltage VX crosses the second voltage VY before the latter settles at the voltage value at which it is supposed to be. Accordingly, the higher the initial value of the second voltage VY is, the longer the ON period Ton is; conversely, the lower the initial value of the second voltage VY is, the shorter the ON period Ton.

As will be understood from formula (5) above, when Ch1>Ch2, VY3>VY0; when Ch1<Ch2, VY3<VY0. Accordingly, by setting the capacitance values Ch1 and Ch2 appropriately, it is possible to obtain desired ON-period characteristics.

Figure 10:
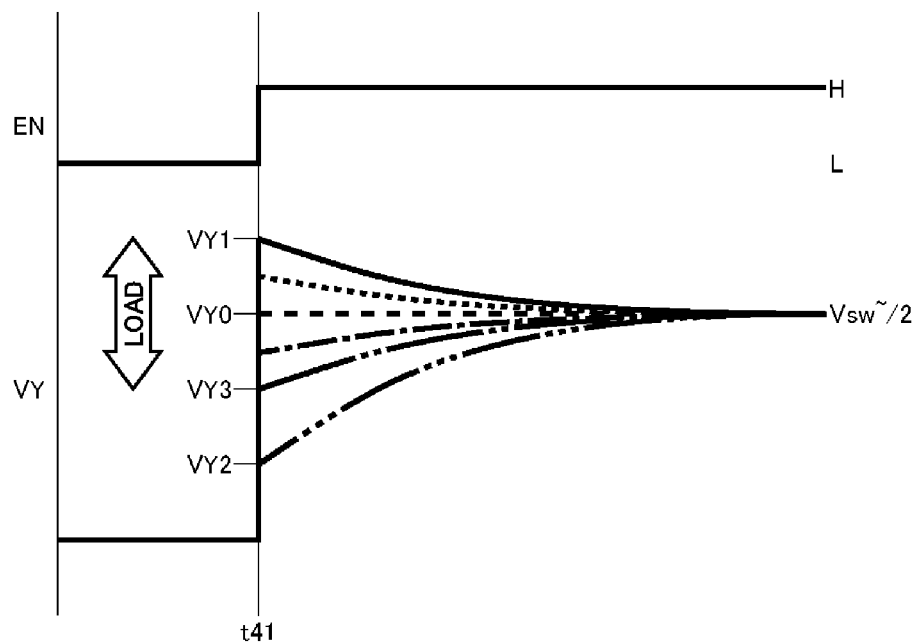
FIG. 10 is a time chart showing pull-up operation with respect to a second voltage VY.

FIG. 10 is a timing chart showing the pull-up operation of the second voltage VY, depicting the behavior of, from top to bottom, the enable signal EN and the second voltage VY. At time point t41, when the enable signal EN is raised to high level, through the pull-up operation described above, the second voltage VY is instantaneously raised to an initial value that suits the load.

For example, the pull-up circuit can be designed such that, in a load region immediately before a transition from the discontinuous-current mode to the continuous-current mode, the initial value VY1 of the second voltage VY is higher than the voltage value at which it is supposed to be (=Vsw~/2) as indicated by a solid line representing the second voltage VY. With this design, when reversal of the coil current IL is detected and a transition to the discontinuous-current mode takes place for a while, the ON period Ton of the transistor N1 is intentionally lengthened. Accordingly, the coil current IL has a greater peak value, and the load is supplied with a higher output current Tout. As an aftereffect of this, for the period of the time constant, operation proceeds in the discontinuous-current mode even with the same output current Tout. Hysteresis is thus secured at a transition from the continuous-current mode to the discontinuous-current mode.

Moreover, the pull-up circuit can be designed such that, the lighter the load is, the lower the initial value of the second voltage VY is as indicated by a dotted line, a dashed line, a dash-and-dot line, or a dash-dot-dot line representing the second voltage VY. With these designs, in the discontinuous-current mode, the lighter the load is, the more the ON period Ton is shortened. This helps reduce output ripples under a light load.

Figure 11:
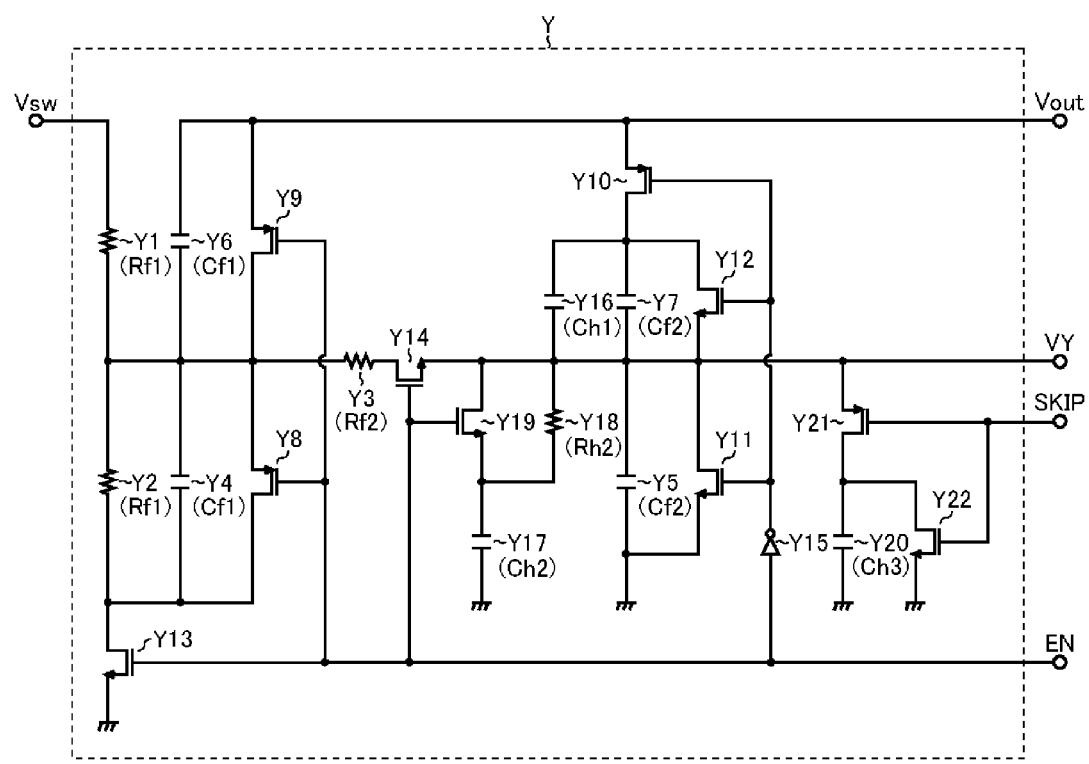
FIG. 11 is a circuit diagram showing a third modified example of a second voltage generator Y.

Second Voltage Generator Third (Modified Example): FIG. 11 is a circuit diagram showing a third modified example of the second voltage generator Y. The second voltage generator Y in this modified example is based on the second modified example (FIG. 9) described previously, and further includes a capacitor Y20, a P-channel MOS field-effect transistor Y21, and an N-channel MOS field-effect transistor Y22. Accordingly, such circuit elements as find their counterparts in the second modified example described previously are identified by the same reference signs as in FIG. 9, and no overlapping description will be repeated. The following description thus focuses on distinctive features of the third modified example.

A source of the transistor Y21 is connected to the output terminal of the second voltage VY. A drain of the transistor Y21 is connected to a first end of the capacitor Y20 (with a capacitance value Ch3) and to a drain of the transistor Y22. A second end of the capacitor Y20 and a source of the transistor Y22 are both connected to the ground terminal. Gates of the transistors Y21 and Y22 are both connected to an input terminal of an operation mode discrimination signal SKIP.

The operation mode discrimination signal SKIP is a logic signal that turns to high level when reversal of the coil current IL is detected and the transistors N1 and N2 are both turned OFF (i.e., in the discontinuous-current mode) and that turns to low level when the transistor N1 is turned ON before reversal of the coil current IL is detected (i.e., in the continuous-current mode).

Interconnected as described above, the capacitor Y20 and the transistors Y21 and Y22 function as a pull-down circuit that transiently pulls down the second voltage VY on completion of a transition from the discontinuous-current mode to the continuous-current mode. To follow is a detailed description of dynamic hysteresis producing operation performed by the pull-down circuit at a transition between operation modes.

Figure 12:
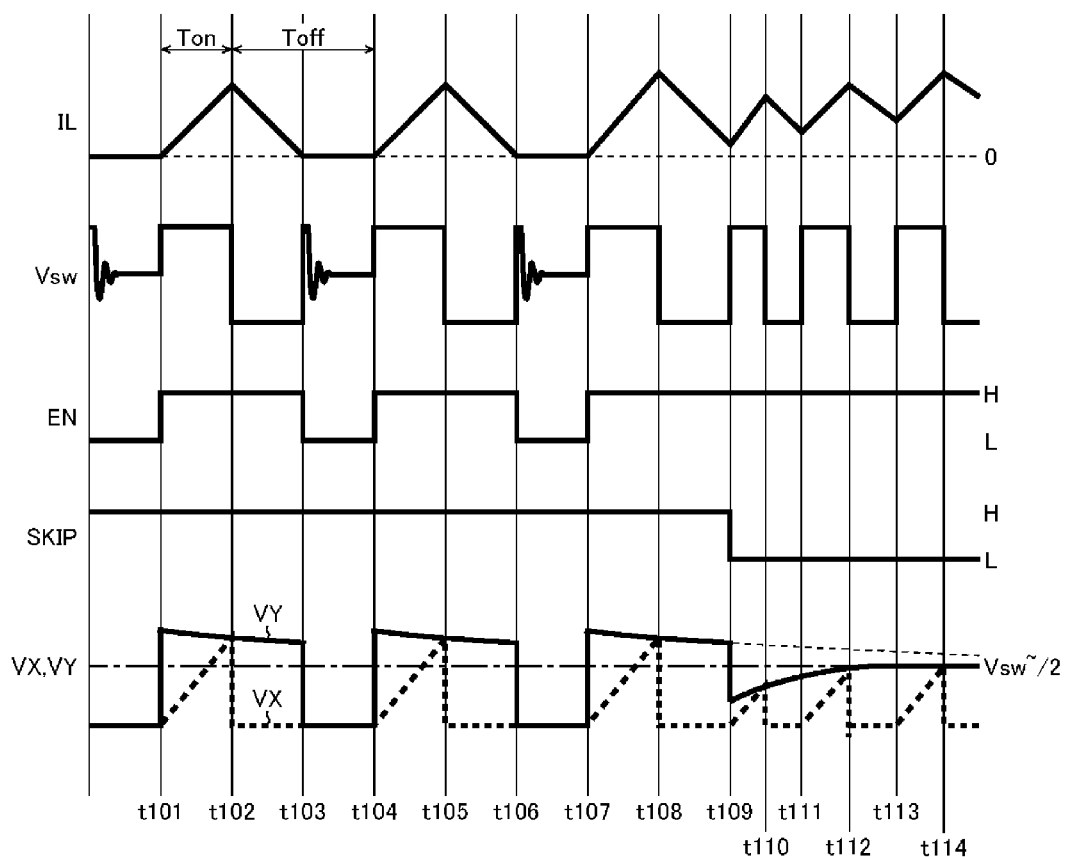
FIG. 12 is a time chart showing pull-down operation with respect to a second voltage VY.

FIG. 12 is a timing chart showing pull-down operation with respect to the second voltage VY, depicting, from top to bottom, the coil current IL, the switching voltage Vsw, the enable signal EN, the operation mode discrimination signal SKIP, the first voltage VX (a broken line), and the second voltage VY (a solid line).

Up to time point t109, the discontinuous-current mode is in effect, in which the coil current IL falls below zero during an OFF period Toff. When no switching takes place, the second voltage generator Y is in a power-saving state, and the second voltage VY remains equal to 0 V. On the other hand, when switching restarts, the second voltage VY is instantaneously raised to an initial value that is higher than the voltage value at which it is supposed to be (Vsw~/2) (see time points t101, t104, and t107). The operation thus far is as described previously.

In the discontinuous-current mode, the operation mode discrimination signal SKIP is kept at high level; thus, the transistor Y21 is OFF, and the transistor Y22 is ON. Accordingly, the capacitor Y20 is short-circuited across it, and thus the pull-down circuit does not affect the generation of the second voltage VY.

On the other hand, at time point t109, as a result of the transistor N1 having been turned ON before reversal of the coil current IL is detected (i.e., before the enable signal EN falls to low level), the operation mode discrimination signal SKIP falls to low level. Now, the transistor Y21 turns OFF, and the transistor Y22 turns ON. Accordingly, the capacitor Y20 is inserted between the output terminal of the second voltage VY and the ground terminal, and thus the second voltage VY is transiently pulled down.

Without the pull-down circuit, as indicated by a fine broken line in FIG. 12, the second voltage VY would gradually return to its original value (=Vsw~/2) according to the time constant τ of the RC low-pass filter. Thus, even after a transition from the discontinuous-current mode to the continuous-current mode, the ON period Ton would remain extended for a while; thus, a state ready to return to the discontinuous-current mode would continue.

By contrast, with the pull-down circuit, once a transition to the continuous-current mode takes place, the second voltage VY is pulled down and the ON period Ton is shortened. As a result, the coil current IL has a smaller peak-to-peak value, making the bottom value of the coil current IL less likely to fall below a zero value; thus, the continuous-current mode is maintained until the output current Tout becomes sufficiently low.

Although FIGS. 11 and 12 deal with, as an example, a configuration where a pull-down circuit is introduced on the basis of the second modified example (FIG. 9), this is not meant to limit the basis on which to introduce a pull-down circuit; a pull-down circuit may be introduced on the basis of the basic configuration (FIG. 6) or the first modified example (FIG. 8) described previously.

Figure 13:
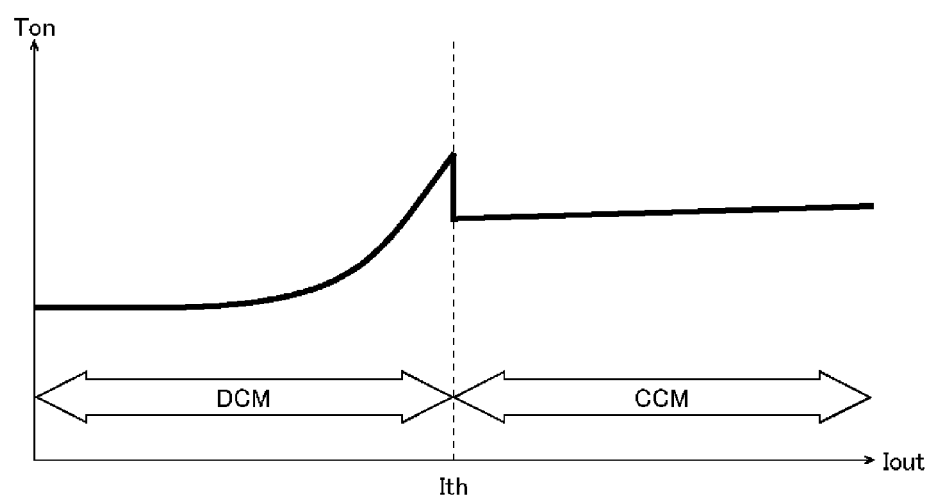
FIG. 13 is a Ton-Iout correlation diagram.

Correlation Between the ON Period and the Output Current: FIG. 13 is a diagram showing a correlation between the ON period Ton and the output current Tout. In the discontinuous-current mode (DCM), in which the output current Tout is lower than a threshold current Ith, the lower the output current Tout is, the more the ON period Ton is shortened. With this ON-time modulation operation, it is possible to prevent an increase in output ripples.

By contrast, in the continuous-current mode (CCM), in which the output current Iout is higher than the threshold current Ith, the ON period Ton is adjusted according to the output current Iout so that the switching frequency fsw does not vary under the influence of the ON-state resistances of the transistors N1 and N2 and the equivalent serial resistance of the coil L1. Such ON-period adjustment operation is achieved, as described previously, by putting a capacitor at the low level VswL (=−RonL×IL~) of the switching voltage Vsw, then, at the time point that the transistor N1 is turned on, starting to charge the capacitor with a current proportional to the high level VswL (=Vin−RonH×IL~) of the switching voltage Vsw, and then taking as the ON period Ton the time required until the capacitor potential reaches the average switch voltage Vsw~.

Moreover, in a load region in which a transition between the discontinuous-current mode and the continuous-current mode takes place, the ON period Ton is given hysteresis. This configuration prevents the continuous-current mode and the discontinuous-current mode from being repeated irregularly at a transition from a light load to a heavy load (or at a transition from a heavy load to a light load). Thus, it is possible to prevent an increase in the ripple component in the output voltage Vout resulting from irregular mode transitions.

Figure 14:
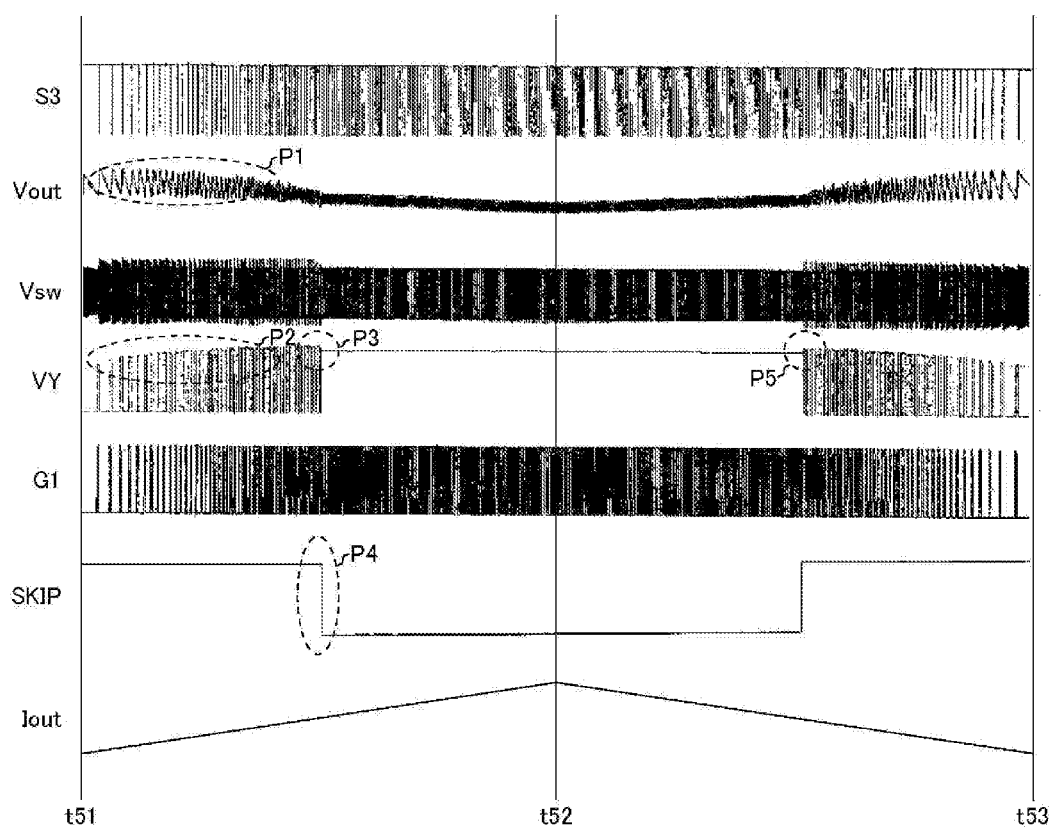
FIG. 14 is a time chart showing an example of transitions in output behavior resulting from a rise and a fall in load.

Simulation Results: FIG. 14 is a timing chart showing an example of transitions in the output behavior accompanying a rise and a fall in the load, depicting, from top to bottom, the reset signal S3, the output voltage Vout, the switching voltage Vsw, the second voltage VY, the gate signal G1, the operation mode discrimination signal SKIP, and the output current Tout.

As observed in regions P1 and P2, when the switching frequency fsw drops under a light load, the second voltage VY is pulled down so that the ON period Ton is shortened. It is thus possible to prevent an increase in output ripples under a light load.

As observed in regions P3 and P4, at a transition from the discontinuous-current mode to the continuous-current mode, the second voltage VY is transiently pulled down. On the other hand, as observed in region P5, at a transition from the continuous-current mode to the discontinuous-current mode, the second voltage VY is raised to a voltage value that is higher than the integral value (=Vsw⁻/2) obtained by the RC low-pass filter. This gives the ON period Ton hysteresis, and it is thus possible to stabilize transition between the two modes.

Figure 15:
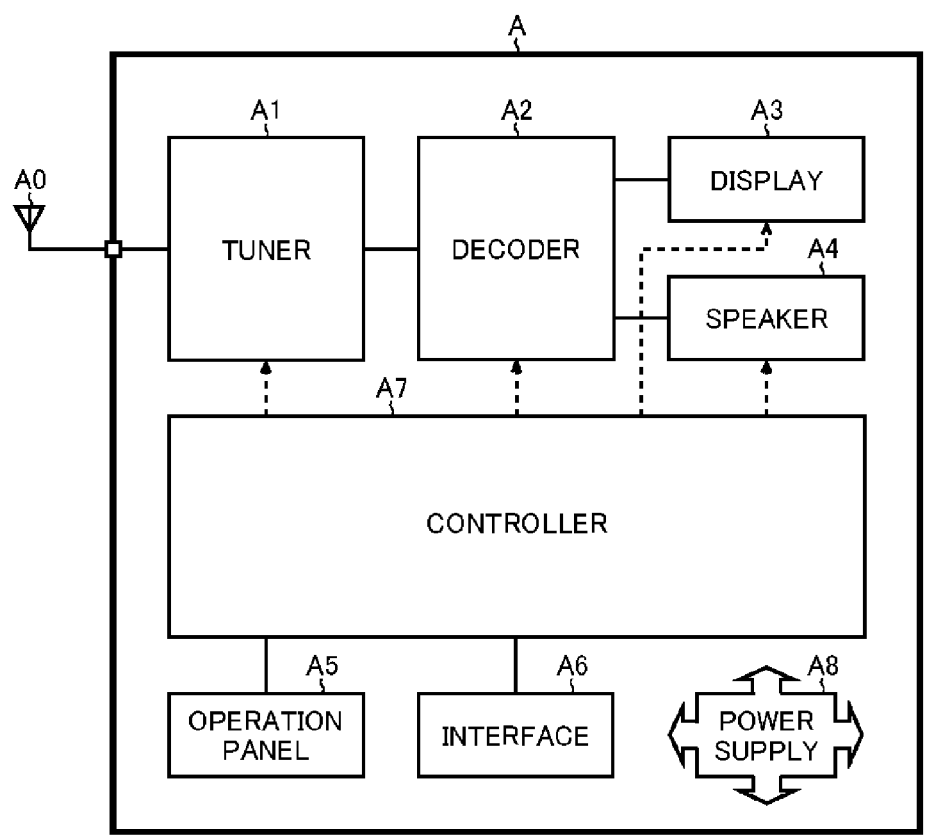
FIG. 15 is a block diagram showing one configuration example of a television receiver incorporating a switching power supply device.
Figure 16A:
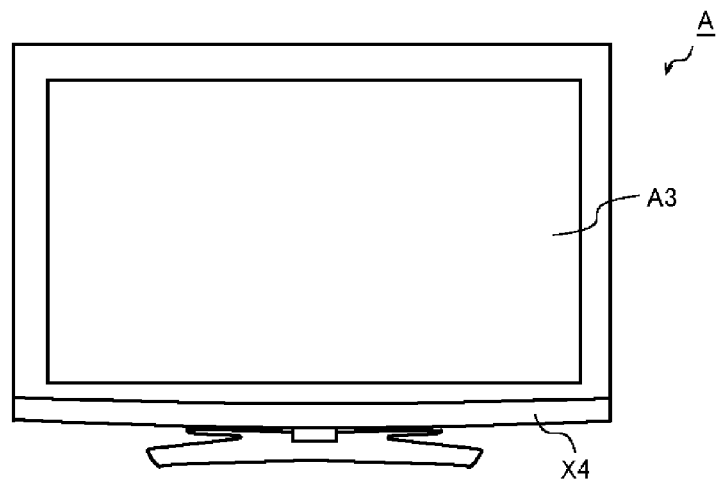
FIG. 16A is a front view of a television receiver incorporating a switching power supply device.
Figure 16B:
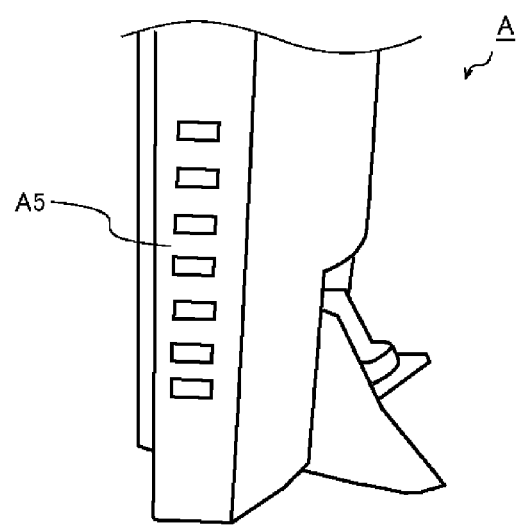
FIG. 16B is a side view of a television receiver incorporating a switching power supply device.
Figure 16C:
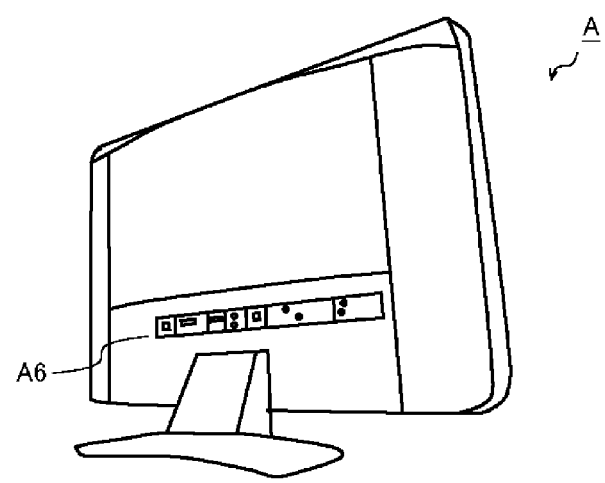
FIG. 16C is a rear view of a television receiver incorporating a switching power supply device.

Application to a Television Receiver: FIG. 15 is a block diagram showing one configuration example of a television receiver incorporating a switching power supply device as described above. FIGS. 16A to 16C are a front view, a side view, and a rear view, respectively, of a television receiver incorporating a switching power supply device as described above. The television receiver A of this configuration example includes a tuner A1, a decoder A2, a display A3, a speaker A4, an operation panel A5, an interface A6, a controller A7, and a power supply A8.

The tuner A1 selects a broadcast signal of a desired channel from signals received via an antenna A0 which is externally connected to the television receiver A.

The decoder A2 generates a video signal and an audio signal from the broadcast signal selected by the tuner A1. The decoder A2 can also generate a video signal and an audio signal based on an external input signal from the interface A6.

The display A3 outputs video based on the video signal generated by the decoder A2.

The speaker A4 outputs audio based on the audio signal generated by the decoder A2.

The operation panel A5 is a kind of human interface that accepts user operation. The operation panel A5 can comprise buttons, switches, a remote control, etc.

The interface A6 is a front end that receives an external input signal from an external device (such as an optical disc player or a hard disk drive).

The controller A7 controls the above-mentioned blocks A1 to A6 in a comprehensive fashion. The controller A7 can comprise a CPU (central processing unit), etc.

The power supply A8 feeds electric power to the above-mentioned blocks A1 to A7. As the power supply A8, a switching power supply device 1 as described previously can be used suitably.

Other Modified Examples: Although the embodiments described above deal with, as examples, a configuration in which the present invention is applied to a step-down switching power supply device, this is not meant to limit the application of the present invention; for example, the output stage of the switching power supply device may instead be of a step-up type, a step-up/step-down type, or an inverting type.

Although the embodiments described above deal with, as examples, a fixed-ON-period switching power supply device (ON-period setting circuit), this is not meant to limit the application of the present invention; with an RC network modified on a technical principle similar to that described herein, the present invention is equally applicable to a fixed-OFF-period switching power supply device (OFF-period setting circuit).

The present invention can be implemented in any manner other than specifically described herein, and allows for many modifications within the spirit of the present invention. That is, the embodiments described above should be considered to be in every aspect simply illustrative and not restrictive; it should be understood that the technical scope of the present invention is not defined by the description of embodiments given above but by the appended claims, and encompasses any modification made in the scope and sense equivalent to those of the claims.

Industrial Applicability: Switching power supply devices according to the present invention find applications as power supplies (e.g., power supplies for SOC (system-on-chip) devices and peripheral devices) incorporated in various electronic devices such as liquid crystal displays, plasma displays, BD recorders/players, set-top boxes, and personal computers.

What is claimed is:

1. An ON-period setting circuit provided in a fixed-ON-period switching power supply device that produces a desired output voltage from an input voltage by driving a coil by turning ON and OFF an output transistor and a synchronous rectification transistor, wherein
the ON-period setting circuit is configured to shorten an ON period the more the lighter a load is in a discontinuous-current mode, wherein
the ON-period setting circuit comprises:
a first voltage generator configured to generate a first voltage having a ramp waveform that keeps rising over the ON period;
a second voltage generator configured to generate a predetermined second voltage; and
a comparator that compares the first and second voltages with each other to end the ON period, wherein
the second voltage generator pulls down the second voltage the more the lighter the load is in the discontinuous-current mode.

2. The ON-period setting circuit of claim 1, wherein the second voltage generator includes:
an RC filter that generates the second voltage by integrating a switching voltage appearing at a connection node between the output transistor and the synchronous rectification transistor, or by integrating a divided voltage of the switching voltage;
a current path breaker that cuts off a current path from an input terminal of the switching voltage to a ground terminal when switching stops; and
a pull-up circuit configured to instantaneously pull up the second voltage to a predetermined initial value by capacitively dividing the output voltage when switching restarts.

3. The ON-period setting circuit of claim 2, wherein the pull-up circuit is configured to make the initial value the lower the lighter the load is.

4. The ON-period setting circuit of claim 3, wherein the pull-up circuit is configured to make the initial value higher than an integral value obtained from the RC filter in a load region immediately before a transition from the discontinuous-current mode to a continuous-current mode.

5. The ON-period setting circuit of claim 1, wherein the second voltage generator includes a pull-down circuit configured to transiently pull down the second voltage on completion of a transition from the discontinuous-current mode to a continuous-current mode.

6. The ON-period setting circuit of claim 2, wherein the second voltage generator includes a pull-down circuit configured to transiently pull down the second voltage on completion of a transition from the discontinuous-current mode to a continuous-current mode.

7. The ON-period setting circuit of claim 3, wherein the second voltage generator includes a pull-down circuit configured to transiently pull down the second voltage on completion of a transition from the discontinuous-current mode to a continuous-current mode.

8. The ON-period setting circuit of claim 4, wherein the second voltage generator includes a pull-down circuit configured to transiently pull down the second voltage on completion of the transition from the discontinuous-current mode to a continuous-current mode.

9. An ON-period setting circuit provided in a fixed-ON-period switching power supply device that produces a desired output voltage from an input voltage by driving a coil by turning ON and OFF an output transistor and a synchronous rectification transistor, wherein the ON-period setting circuit is configured to transiently shorten an ON period on completion of a transition from a discontinuous-current mode to a continuous-current mode, wherein the ON-period setting circuit comprises:

a first voltage generator configured to generate a first voltage having a ramp waveform that keeps rising over the ON period;

a second voltage generator configured to generate a predetermined second voltage; and a comparator that compares the first and second voltages with each other to end the ON period, wherein the second voltage generator transiently pulls down the second voltage on completion of the transition from the discontinuous-current mode to the continuous-current mode.

10. A power control IC comprising, integrated therein:

a ripple injection circuit configured to generate a feedback voltage by superposing a ripple voltage, which imitates a coil current, on an output voltage or on a divided voltage of the output voltage;

a reference voltage generation circuit configured to generate a predetermined reference voltage;

a main comparator that compares the feedback voltage and the reference voltage with each other to generate a comparison signal;

a one-shot pulse generation circuit configured to generate a one-shot pulse in a set signal according to the comparison signal;

an RS flip-flop that sets an output signal at a first logic level according to the set signal and that resets the output signal at a second logic level according to a reset signal;

an ON-period setting circuit configured to generate a one-shot pulse in the reset signal at a lapse of an ON period after the output signal is set at the first logic level;

a gate driver circuit configured to generate a drive signal for an output transistor and a synchronous rectification transistor according to the output signal; and a detection circuit configured to detect reversal of the coil current to forcibly turn OFF the synchronous rectification transistor, wherein the ON-period setting circuit is provided in a fixed-ON-period switching power supply device that produces the output voltage from an input voltage by driving a coil by turning ON and OFF the output transistor and the synchronous rectification transistor, wherein the ON-period setting circuit is configured to shorten the ON period the more the lighter a load is in a discontinuous-current mode.

11. A power control IC comprising, integrated therein:

a ripple injection circuit configured to generate a feedback voltage by superposing a ripple voltage, which imitates a coil current, on an output voltage or on a divided voltage of the output voltage;

a reference voltage generation circuit configured to generate a predetermined reference voltage;

a main comparator that compares the feedback voltage and the reference voltage with each other to generate a comparison signal;

a one-shot pulse generation circuit configured to generate a one-shot pulse in a set signal according to the comparison signal;

an RS flip-flop that sets an output signal at a first logic level according to the set signal and that resets the output signal at a second logic level according to a reset signal;

an ON-period setting circuit configured to generate a one-shot pulse in the reset signal at a lapse of an ON period after the output signal is set at the first logic level;

a gate driver circuit configured to generate a drive signal for an output transistor and a synchronous rectification transistor according to the output signal; and a detection circuit configured to detect reversal of the coil current to forcibly turn OFF the synchronous rectification transistor, wherein the ON-period setting circuit is provided in a fixed-ON-period switching power supply device that produces the output voltage from an input voltage by driving a coil by turning ON and OFF the output transistor and the synchronous rectification transistor, wherein the ON-period setting circuit is configured to transiently shorten the ON period on completion of a transition from a discontinuous-current mode to a continuous-current mode.

12. A switching power supply device, comprising:

the power control IC of claim 10; and a switching output stage of which a part or a whole is externally fitted to the power control IC, the switching output stage being configured to generate the output voltage from the input voltage.

13. A switching power supply device, comprising:

the power control IC of claim 11; and a switching output stage of which a part or a whole is externally fitted to the power control IC, the switching output stage being configured to generate the output voltage from the input voltage.

* * * * *